United States Patent [19]

Hull

[11] Patent Number: 4,675,241

[45] Date of Patent: Jun. 23, 1987

[54] HONEYCOMB PART WITH DENSIFIED OUTER PERIPHERY

[75] Inventor: Harold R. Hull, San Leandro, Calif.

[73] Assignee: Hexcel Corporation, San Francisco, Calif.

[21] Appl. No.: 664,467

[22] Filed: Oct. 25, 1984

[51] Int. Cl.⁴ .............................................. B32B 3/12
[52] U.S. Cl. ..................................... 428/116; 52/806; 156/267; 264/163; 425/383
[58] Field of Search ................. 428/116, 117, 118, 73; 264/163; 425/289, 383; 156/267; 52/806

[56] References Cited

U.S. PATENT DOCUMENTS

| | | | |
|---|---|---|---|
| 2,720,948 | 10/1955 | Pajak | 428/116 X |
| 2,728,479 | 12/1955 | Wheeler | 428/116 X |
| 2,793,718 | 5/1957 | Pajak | 428/118 |
| 3,836,302 | 9/1974 | Kaukeinen | 428/116 X |
| 4,160,685 | 7/1979 | Kuroda | 428/79 X |
| 4,233,351 | 11/1980 | Okumura et al. | 428/116 X |
| 4,455,336 | 6/1984 | Ogawa et al. | 428/116 |

Primary Examiner—Henry F. Epstein
Attorney, Agent, or Firm—Townsend and Townsend

[57] ABSTRACT

A honeycomb part having a densified, frame-like outer periphery formed from compressed honeycomb cells which provide a relatively smooth, snag-free surface. The invention further includes the method of holding honeycomb stock material is a desired configuration and compressing an amount of the outer peripheral portion of the material beyond that configuration back to the configuration itself, thus providing the densified outer periphery of the honeycomb part. The apparatus for compressing and thereby densifying the honeycomb stock material includes a die having upper and lower knife edge gripping members and a cutting die which moves into cutting relationship to the honeycomb stock material to cut the material to the desired configuration. Then, the die, being stroked by a suitable press, continues to move and while doing so, presses the portion of the outer periphery of the stock material between the die and the knife edge grippers, compressing and thereby densifying the stock material.

12 Claims, 5 Drawing Figures

U.S. Patent  Jun. 23, 1987  4,675,241
FIG. 1 (PRIOR ART)
FIG. 2
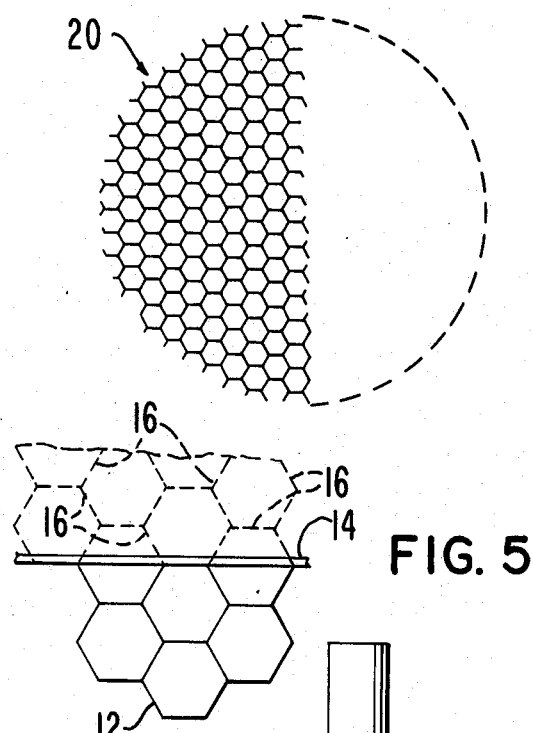
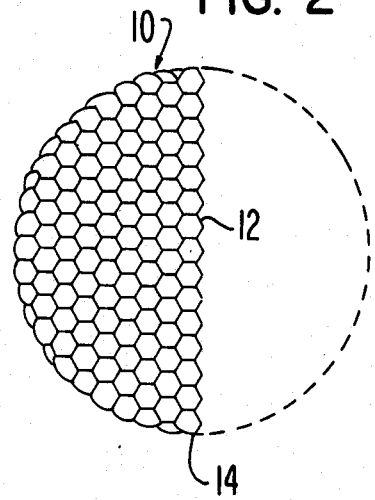
FIG. 5
FIG. 4
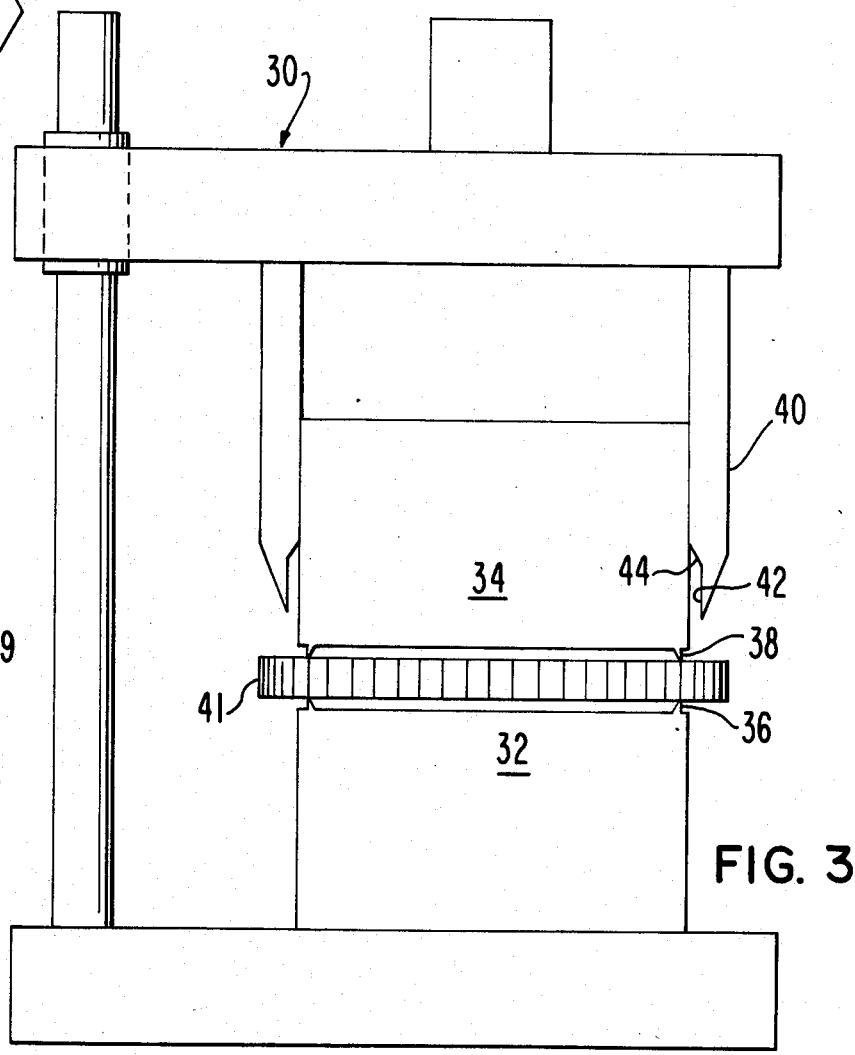
FIG. 3

HONEYCOMB PART WITH DENSIFIED OUTER PERIPHERY

This invention relates to improvements in the formation of honeycomb products and, more particularly, to an improved honeycomb product having a densified outer periphery and a method of making such product.

BACKGROUND OF THE INVENTION

The outer periphery of a honeycomb body shaped to a particular form contains a series of partial cells which present a jagged surface. This surface is prone to snagging or catching onto whatever adjacent structure it may contact. In fact, such jagged outer surface is much like a series of barbed projections. It does not allow free movement of a honeycomb product among a group of pieces and makes the orientation, feeding or handling of such a product very difficult and cumbersome.

Attempts have been made in the past to solve this problem. One attempt has been to encase a honeycomb product of the type described in a separate frame. Another attempt has been to encapsulate the partial cells at the outer periphery of the honeycomb product with a resin or similar material to form a continuous smooth outer peripheral edge or wall. In general, none of these attempts have been satisfactory for one or more reasons and a need has continued to exist for a honeycomb product having a frame-like outer periphery in which the product is relatively smooth and is snag-free so that it can be oriented, machine-fed or otherwise handled without snagging onto adjacent structures.

SUMMARY OF THE INVENTION

The present invention is directed to a honeycomb product having a frame-like outer periphery which is comprised of a plurality of densified partial cells which have been compressed to form a relatively rigid outer periphery for the product. Another aspect of the present invention is the provision of a method and apparatus for densifying the outer periphery of honeycomb stock material in such a way that the main body portion of the honeycomb stock material remains expanded and intact while the outer periphery is compressed after being cut to a specific configuration. Thus, the process and apparatus of the present invention is not limited to any specific shapes, and products from honeycomb stock material can be quickly and easily manufactured at a high yield rate in a minimum of time and with a minimum expenditure for capital equipment.

The primary object of the present invention is to provide an improved honeycomb product of the type having a main honeycomb body and a densified outer periphery formed from compressing the outer peripheral margin of the honeycomb stock material as the stock material is held and after being cut to a specific configuration, whereby the product can be suitable for a wide variety of applications in which the product requires a rigid outer peripheral margin while providing a standard honeycomb body inwardly of said margin.

Another object of the present invention is to provide an apparatus and method for forming a honeycomb product of the type described wherein the honeycomb stock material is held by and between knife edge grippers which define the resulting configuration of the honeycomb product and which are spaced inwardly from a shiftable die, whereby the honeycomb material in the region between the grippers and the die is compressed as the die moves past the grippers to thereby cause the material to be cut and the partial and other cells at the outer periphery of the honeycomb stock material to be compressed to form said frame-like outer periphery in a simple manner and at a high rate of production.

Other objects of this invention will become apparent as the following specification progresses, reference being had to the accompanying drawings for an illustration of the invention.

IN THE DRAWING

FIG. 1 is a plan view of a prior art honeycomb body showing a jagged, dog-eared outer margin which is conventionally cut to shape;

FIG. 2 is a view similar to FIG. 1 but showing a honeycomb part processed by the densification method of the present invention, showing a frame-like outer periphery for the part;

FIG. 3 is a schematic view of the press for densifying the part of FIG. 2;

FIG. 4 is an enlarged, fragmentary, cross sectional view of the annular support means (gripper) forming a part of the die set for holding the honeycomb stock material in position in the die for densification of the part; and FIG. 5 is an enlarged, fragmentary plan view of an outer margin of a honeycomb part, showing the jagged, dog-eared outer margin in dashed lines and the densified portion being shown in full lines.

The present invention is directed to the densification of a honeycomb part of any desired outer peripheral configuration and of any desired thickness. For purposes of illustration, FIG. 2 shows honeycomb part 10 as being circular. Part 10 comprises a honeycomb body 12 having a densified outer frame-like portion or wall 14 formed by the compressed outer cell walls 16 of body part 12 in a manner hereinafter described, cell walls 16 being shown in dashed lines in FIG. 5. These cell walls 16 are forced inwardly in a manner such that they become essentially packed adjacent to each other to form the barrier which is the wall 14. For instance, some of the cell walls 16 overlap each other while others are deformed. It makes no difference exactly how the cell walls 16 are finally positioned; it is sufficient to state that the walls do, in fact, become packed or densified to form a permanent set, thereby assuring that wall 14 remains relatively rigid, and of a specific shape at all times.

Body part 10 is to be contrasted with the prior art honeycomb body part of the type shown in FIG. 1 and denoted by the numeral 20. In this body part, the part has jagged, dog-eared outer edges which are conventionally cut to shape. To maintain the shape, a ring is typically placed around the outer periphery of body part 20. This ring most likely must be somehow connected to the body part 20 and such connection is difficult to maintain. The problems associated with the prior art body part of FIG. 1 are clearly overcome by the use of honeycomb part 10 of the present invention inasmuch as wall 14 thereof is substantially rigid and supports the part even through the part is subjected to lateral, axial and other forces during use. A typical use of part 10 after it has been provided with wall 14 is use as a collimator screen in a mass airflow sensor.

FIG. 3 shows a die press 30 having a lower pedestal 32 and an upper piston 34, both pedestal 32 and piston 34 having continuous knife edge grippers 36 and 38, respectively, gripper 38 to be shown in more detail in FIG. 4. A cut and form die 40 is shiftably carried on piston 34 and moves with the piston as the piston moves downwardly until edge gripper 38 engages honeycomb stock material 41 between grippers 36 and 38. Then, die 40 continues downwardly and the cutting edge 42 shears off the outer periphery of the honeycomb stock 41 and then continuing down sloping ramp area 44 densifies the outer edge margin to form honeycomb part 10 with outer peripheral wall 14 thereon. As shown in FIG. 3, die 40 has an axially extending segment 42 thereon and a sloping segment 44 coextensive with and above segment 42.

In operation, honeycomb stock 41 is inserted between knife edge grippers 36 and 38, and as the piston 34 is lowered, it drives the knife edge grippers 36 and 38 into the honeycomb stock, thereby defining the shape of the resulting product and holding it in that position. As the press 30 continues its stroke, the piston being loaded by air pressure (or hydraulic or springs or other means) against the honeycomb as the cutting edge of the die continues downwardly through the honeycomb, shearing off the outer periphery of the honeycomb. The sharpened cutting edge of the lower margin of the die is some distance radially outwardly of the knife edge grippers to provide the margin of material for densification.

As the press continues its stroke, the inner segments 42 and 44 of the die will contact the extended or overhanging portion of the honeycomb, forcing the honeycomb into the space or recess 39 adjacent to knife edge grippers 36 and 38, thereby providing the densified wall 14 for part 10. As the press continues its stroke, first the cutting die then the piston are withdrawn, leaving the finished product within the die for removal.

The present invention provides an improved honeycomb product in which the product itself is compressed and densified at its outer margin to provide a frame-like perimeter enclosure with a relatively smooth, snag-free surface. This enables the honeycomb product to be oriented, machine-fed and handled in equipment intended to do so. The product can be applied where an enclosed edge appearance is required or desired for a mechanical or an aesthetic purpose. For example, the honeycomb product can be fed into a robotic handling system for insertion into another component.

I claim:

1. A honeycomb product comprising: a honeycomb body having an outer peripheral margin, said margin initially being a series of partial cells which present a jagged surface, being comprised of a plurality of relatively smooth and snag-free cell walls, and being of a relatively rigid material capable of being formed and of undergoing a permament set, the cell walls at the outer peripheral margin initially projecting outwardly from said body and being formed and compressed to present a frame-like, densified relatively rigid outer periphery for the body.

2. A product as set forth in claim 1, wherein at least portions of certain of said cell walls, when the same are bent extend longitudinally of the outer periphery of the body.

3. A product as set forth in claim 1, wherein the outer periphery has a finite thickness.

4. A method of forming a honeycomb product from honeycomb stock material having an outer peripheral margin of partial cells which present a jagged surface comprising: gripping the honeycomb stock material at continuous zones on opposed faces of the stock material inboard of the outer peripheral margin thereof; presenting a continuous outer peripheral space immediately outboard of said zones; compressing and forcing the portion of the honeycomb stock material outboard of the gripping zones into said space to form a densified, frame-like outer periphery for the body.

5. A method as set forth in claim 4, wherein said compressing step includes filling a recess near the gripping zones with the excess material outboard of the zones.

6. A method as set forth in claim 4, wherein is included the step of cutting the honeycomb stock material before the periphery portion of the honeycomb stock material is compressed.

7. A method as set forth in claim 4, wherein said compressing step includes forcing the honeycomb stock material inwardly toward the gripping zones.

8. A method as set forth in claim 4, wherein is included the step of cutting the honeycomb stock material immediately before the forcing step.

9. A method as set forth in claim 7, wherein said forcing step includes applying a force to the honeycomb stock material with the force having a line of action at an angle with respect to the axes of the cells of the honeycomb stock material.

10. Apparatus for forming a honeycomb product having a densified outer periphery comprising: means defining a pair of spaced, generally continuous gripper members; means for moving one of the gripper members toward the other gripper member to clamp a layer of honeycomb stock material between the gripper members there being means for forming a continuous outer peripheral space immediately outboard of the gripper members; a die shiftably mounted for movement relative to the gripper members; and means for moving the die into compressing relationship to the outer jagged peripheral portion of the honeycomb stock material layer to force said outer jagged peripheral portion into said space so as to form said densified outer periphery.

11. Apparatus as set forth in claim 10, wherein is included a pedestal and a piston, the gripper members being on the pedestal and piston, respectively, the gripper members being transversely V-shaped to present pointed knife edges.

12. Apparatus as set forth in claim 10, wherein the die has an outer periphery provided with a V-shaped cutting edge and an inclined compressing surface axially aligned with the inner surface of the cutting edge.

* * * * *